(12) United States Patent
Chou et al.

(10) Patent No.: US 9,130,975 B2
(45) Date of Patent: Sep. 8, 2015

(54) GENERATION OF MACROS

(75) Inventors: Wu Chou, Basking Ridge, NJ (US); Li Li, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 172 days.

(21) Appl. No.: 12/943,469

(22) Filed: Nov. 10, 2010

(65) Prior Publication Data

US 2011/0302499 A1     Dec. 8, 2011

Related U.S. Application Data

(60) Provisional application No. 61/350,602, filed on Jun. 2, 2010.

(51) Int. Cl.
*G06F 3/048*     (2013.01)
*G06F 9/45*     (2006.01)
*G06F 15/16*     (2006.01)
*H04L 29/08*     (2006.01)

(52) U.S. Cl.
CPC ............ *H04L 67/14* (2013.01); *H04L 67/02* (2013.01)

(58) Field of Classification Search
CPC ........................................... G06F 3/048
USPC ............................................. 715/738
See application file for complete search history.

(56) References Cited

U.S. PATENT DOCUMENTS

| | | | | |
|---|---|---|---|---|
| 7,139,978 B2* | 11/2006 | Rojewski et al. | ............. | 715/744 |
| 2005/0278728 A1* | 12/2005 | Klementiev | .................. | 719/328 |
| 2006/0005132 A1* | 1/2006 | Herdeg, III | .................. | 715/704 |
| 2009/0327880 A1* | 12/2009 | Ide | ................................ | 715/261 |
| 2010/0023506 A1* | 1/2010 | Sahni et al. | ........................ | 707/5 |
| 2011/0041140 A1* | 2/2011 | Harm et al. | .................... | 719/318 |
| 2011/0078234 A1* | 3/2011 | Engel | ............................. | 709/203 |
| 2011/0264793 A1* | 10/2011 | Goldman et al. | ............. | 709/224 |

OTHER PUBLICATIONS

Andhy Koesnandar et al. "Using assertions to help end-user programmers create dependable web macros" (SIGSOFT '08/FSE-16 proceedings of the 16th ACM SIGSOFT International Symposium on Foundations of software engineering, Nov. 19, 2008, pp. 124-134).*

(Continued)

*Primary Examiner* — Jennifer To
*Assistant Examiner* — Xuyang Xia
(74) *Attorney, Agent, or Firm* — Sheridan Ross P.C.

(57) ABSTRACT

A method and apparatus that learns and generates procedures for machine-to-machine interactions by monitoring user browser interactions with the server. Based on an action by a user of the web browser, a communication is sent from the web browser to the server, which is recorded by a macro recorder. The communication is in a first format such as HTML, which contains human-readable API documentation for a user's interactions with the server. The web browser receives a response to the communication which contains a response in the first format and a response in a second format. The second format is parsed to produce a normalized representation. The normalized representation describes the machine-readable API and the service invocation flow that can be interpreted by a particular programming language to generate service macros to invoke the services programmatically from a remote client to a server that supports the same services for machine-to-machine interaction.

18 Claims, 5 Drawing Sheets

(56) References Cited

OTHER PUBLICATIONS

MJT Net, "Press Releases," Oct. 29, 1998 through Jan. 2, 2008, website: http://www.mjtnet.com/press_releases.htm, printed Aug. 26, 2010, 13 pages.

Safonov, A., et al., "Towards Web Macros: a Model and a Prototype System for Automating Common Tasks on the Web," dated Jun. 3, 1999, University of Minnesota, Minneapolis, Minnesota, USA, printed from website: http://zing.ncsl.nist.gov/hfweb/proceedings/safonov, on Aug. 26, 2010, 11 pages.

Graham-Rowe, D., "Software that Learns by Watching," Technology Review, published by MIT, website: http://www.technologyreview.com/computing/25351/?a=f, printed Oct. 12, 2010, 4 pages.

* cited by examiner

GENERATION OF MACROS

RELATED U.S. PATENT APPLICATION DATA

This application claims the benefit under 35 U.S.C. §119 (e) of U.S. Provisional Application No. 61/350,602, filed Jun. 2, 2010, entitled "Micro browser: A Client Architecture and System to Support Dual RESTful Web Services," which is incorporated herein in its entirety by reference.

TECHNICAL FIELD

The system and method relates to generation of macros of communications between web browsers and servers, and in particular to generation of macros in different formats.

BACKGROUND

Today, when a software engineer develops an application, the software engineer will typically use documentation about how a particular service works. For example, a web service may provide documentation about how to access features of the web service in the form of an Application Programming Interface (API). The software engineer will take the documentation and generate an application that accesses various services provided by the API. However, in many instances, the documentation does not always match the API. This can be due to errors that are introduced as the documentation is written. Other problems can occur when specific information about how the API work is left undocumented or there is limited documentation about specific features of the API. For instance, a function call may return an undocumented error code or an error code with limited explanation. This can lead to frustration by software engineers and service errors due to the inconsistency and incompleteness in the documentation about the actual APIs. And this is in addition to the increased time and effort to develop applications that use the APIs and are compatible to the required service flow.

There are various ways that providers of services have tried to address this issue. For example, extensive testing of API and documentation can be performed. However, this leads to increased time and expense in producing the API documentation. Companies have addressed issues like these by providing customer support. This leads to increased technical support costs. What is needed is a way to easily create applications without having to write programs based on separate API documentation; this will allow applications to be easily created in less time, at less cost, and with less error.

SUMMARY

The system and method are directed to solving these and other problems and disadvantages of the prior art. They generate procedures for machine-to-machine service invocation and interaction by monitoring the user browser interactions with the server, in which a request to start recording communication exchanges between a web browser and a server is received. Based on an action by a user of the web browser (e.g., the user clicking on a button on a web page), a communication is sent from the web browser to the server, which is recorded by a macro recorder. The communication is in a first format such as Hyper Text Markup Language (HTML). The first format may contain human-readable API documentation about the server that guides a user's interactions with the server. The web browser receives a response to the communication in which the response contains a response in the first format and also contains a response in a second format. The second format, combined with the first format, describes the machine-readable API about the server. The second format is typically in a micro format that can reside within the first format. A micro browser parses the response in the second format to produce a normalized representation of the response. The normalized representation describes the machine-readable API and the service invocation flow without the first format and can be interpreted by a particular programming language to generate service macros to invoke the services programmatically from a remote client to a server that supports the same services for machine-to-machine interaction. Normalizing the representation of the response can be, for example, converting a micro format to a computer language, such as JavaScript Object Notation (JSON), RDF, Java, C++, and the like. Based on the communication and the normalized representation of the response, a macro is created in the computer language.

Other embodiments include sending the communication in the first format and the second format and the ability to start and stop recordings under user control to produce specific macros. In addition, an exemplary application development tool is described that allows a user to build applications from the recorded macros. The user can also combine macros to create more complicated macros.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Some embodiments will be illustrated below in conjunction with an exemplary communication system. Although well suited for use with, e.g., a system using server(s) and/or database(s), communications devices, etc., the embodiments are not limited to use with any particular type of communication system or configuration of system elements. Those skilled in the art will recognize that the disclosed techniques may be used in any communication application in which it is desirable to provide enhanced program development services.

Figure 1:
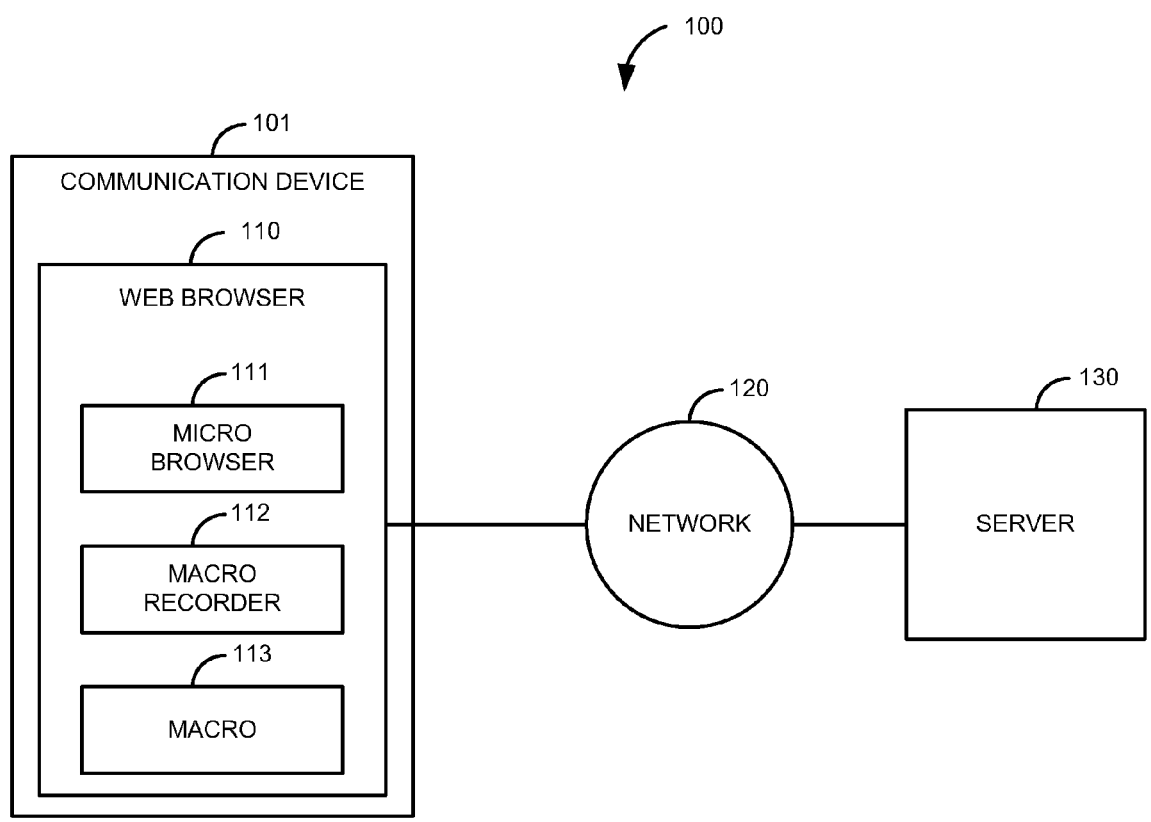
FIG. 1 is a block diagram of a first illustrative system for generating a macro based on communication exchanges between a web browser and a server.

FIG. 1 is a block diagram of a first illustrative system 100 for generating macro 113 based on communication exchanges between web browser 110 and server 130. The first illustrative system comprises communication device 101, network 120, and server 130. Communication device 101 can be any type of communication device such as a Personal Computer (PC), a telephone, a cellular telephone, a Personal Digital Assistant, a server 130, or any device that can communicate with server 130. Communication device 101 further comprises web browser 110. Web browser 110 can be any web browser 110 such as Microsoft Internet Explorer®, Mozilla Firefox®, and the like. Web browser 110 can also include other types of software applications, such as distributed applications, client/server applications, database applications, email applications, and the like. Web browser 110 further comprises micro browser 111, macro recorder 112, and macro 113. Micro browser 111 can be any software/hardware that can parse communications between web browser 110 and server 130. For example, micro browser 111 can parse communications containing formats such as Hyper Text Mark Language (HTML), Extensible HTML (XHTML), Extensible Markup Language (XML), JavaScript Object Notation (JSON), Resource Description Framework (RDF), JavaScript, and/or the like. Macro recorder 112 can be any software/hardware that can record communications, such as a protocol analyzer, a communication monitoring software, and the like. Macro 113 is a software module that contains one or more instruction(s), commands, responses, codes, protocols, and the like, that can be used in developing software applications.

Network 120 can be any type of network, such as the Internet, a Local Area Network (LAN), a Wide Area Network (WAN), the Public Switched Telephone Network (PSTN), a cellular network, a combination of these, and the like. Server 130 can be any type of server, such as a web server, a file server, an application server, a database server, a directory server, and the like.

Micro recorder 112 receives a request to start recording one or more communication exchanges between web browser 110 and server 130. A communication can be any type of communication in any type of protocol(s)/format(s) at any layer. The protocol/format can be, for example, any type of application layer protocol such as HTML, Extended Markup Language (XML), File Transfer Protocol (FTP), XML, and the like. The communication can include multiple protocols at multiple layers, such as HTML at the application layer and Internet Protocol at the network layer. A communication is sent from web browser 110 in a first format to server 130. Macro recorder 112 records the communication sent from web browser 110 to server 130. The recording can occur at one layer or at multiple protocol layers, such as at the application layer, at the presentation layer, at the network layer, and the like. Server 130 sends a response to the communication to web browser 110. The response includes a response in the first format and a response in a second format. For example, the first format can be HTML and the second format can be a micro format. A micro format is a format that is embedded within, or sent in conjunction with, the first format that is ignored by web browser 110. For instance, a micro format can be additional tags within the HTML tags that an HTLM parser (within web browser 110) cannot interpret, but micro browser 111 can interpret. In essence, web browser 110 ignores the micro format and only parses the HTML in the response while micro browser 111 parses the micro format and ignores the HTML.

Micro browser 111 parses the response to produce a normalized representation of the response. A normalized representation of the response can be accomplished by converting the micro format to a different computer language. For instance, micro browser 111 can convert the micro format to XHTML, JavaScript Object Notation (JSON), Resource Description Framework (RDF), Java, C++, and the like. The above examples describe a micro format as the second format. However, a micro format is not necessarily required. The only requirement is that the first format can be interpreted/parsed by web browser 110 and the second format can be interpreted/parsed by micro browser 111.

Macro recorder 112 generates macro 113 based on the communication and the normalized representation of the response. For example, if the communication was sent in HTML and the normalized representation of the response (converted from a micro format) is in a JSON format, macro recorder 112 can convert the HTML (in the communication) to JSON and produce macro 113 in JSON. In this example, macro 113 contains JSON code of the communication and the response. One advantage is that macro 113 is in a computer language that may be more flexible and provides more features than the first format. This is done while web browser 110 and server 130 communicate in the first format (e.g., HTML).

Figure 2:
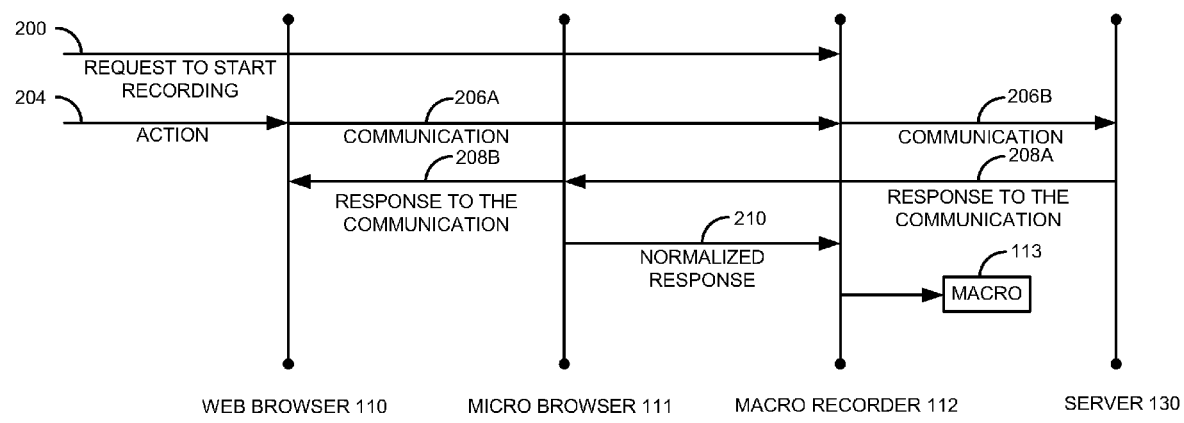
FIG. 2 is a flow diagram of a method for generating a macro based on communication exchanges between a web browser and a server.

FIG. 2 is a flow diagram of a method for generating a macro 113 based on communication exchanges between web browser 110 and server 130. Illustratively, communication device 101 and server 130 are stored-program-controlled entities, such as a computer or processor, which performs the method of FIGS. 2-5 and the processes described herein by executing program instructions stored in a tangible computer readable storage medium, such as a memory or disk.

The process begins in step 200 when a request to start recording one or more communication exchanges between web browser 110 and server 130 is received by macro recorder 112. The request to start recording could be sent based on a user clicking on a record button in web browser 110 (i.e., a button of a browser plug-in or application running in browser 110). An action occurs in step 204 that initiates a communication being sent in step 206A. For example, the action could be a user clicking on a button of a web page being displayed in browser 110. The action of clicking on the button results in web browser 110 sending a communication in a first format in step 206A to macro recorder 112. For instance, the communication could be an HTML GET. The communication is recorded by macro recorder 112 and sent to server 130 in step 206B. Macro recorder 112 may record all or part of the communication. For example, macro recorder 112 may only record the application layer of the communication.

In response to the communication, server 130 sends a response in step 208A. The response comprises a response in the first format and a response in a second format. For example, if the first format is XHTML, then the response will contain a response in XHTML and a response in the second format. Micro browser 111 receives the response in step 208A as well as web browser 110 in step 208B. Micro browser 111 parses the response sent in step 208A to produce a normalized representation of the response in step 210. This can be done in various ways. For example, depending on the second format, micro browser 111 can normalize the second format to different types of computer languages such as JSON, RDF, C++, Java, JavaScript, and the like. This way, micro browser 111 can generate different types of computer languages depending on what second format server 130 sends in the response to the communication. Macro recorder 112 generates macro 113 based on the communication sent in step 206A and the normalized representation of the response (from step 210).

Figure 3:
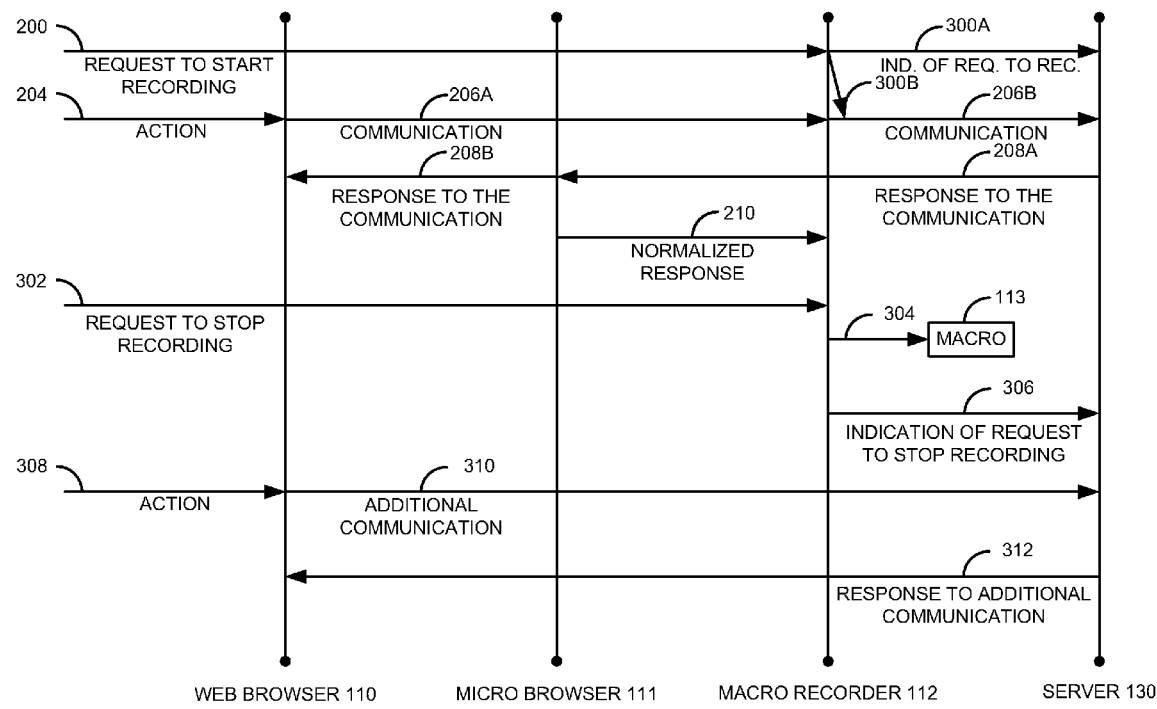
FIG. 3 is a flow diagram of a method for generating a macro based on communication exchanges between a web browser and a server.

FIG. 3 is a flow diagram of a method for generating a macro 113 based on communication exchanges between web browser 110 and server 130. The process begins in step 200 when a request to start recording one or more communication exchanges between web browser 110 and server 130 is received by macro recorder 112. An indication of the request to start recording can optionally be sent in steps 300A or 300B to server 130. This way, server 130 will know when to start sending the second format in any responses to communications from web browser 110. For example, a separate message can be sent in step 300A that contains the indication of the request to start recording. The indication of the request to start recording can be sent as part of the communication sent in step 206B. The request to start recording can also include a request to respond with a specific type of second format. An action occurs in step 204 that initiates a communication being sent in step 206A. The communication is recorded by macro recorder 112 and sent to server 130 in step 206B.

In response to receiving the communication sent in step 206B and, optionally, the indication of the request to start recording received in step 300, server 130 sends a response in step 208A. The response comprises a response in the first format and a response in the second format. The second format can be a predetermined format or can be different types of formats based on the optional request to respond with a specific type of second format.

Micro browser 111 receives the response in step 208A as well as web browser 110 in step 208B. Micro browser 111 parses the second format in the response sent in step 208A to produce a normalized representation of the response. The normalized representation of the response is sent to macro recorder 112 in step 210. The normalized representation of the response can be different based on what type the second format is. For example, if the second format were type X, the normalized representation of the response can be Java code. If the second format were type Y, the normalized representation of the response can be JSON. A request to stop recording is sent to macro recorder 112 in step 302. The request to stop recording can be generated by a user clicking on a stop recording button in a browser plug-in, an application, and the like. Based on receiving the request to stop recording, macro recorder 112 generates macro 113 in step 304.

Macro recorder 112 sends an indication of the request to stop recording to server 130 in step 306. An action occurs in step 308 that initiates an additional communication being sent in step 310 to server 130. For example, the action could be a user clicking on a button of a web page being displayed in web browser 110. The action of clicking on the button results in web browser 110 sending the additional communication in the first format in step 310. Server 130 receives the additional communication sent in step 310. Server 130 sends a response to the additional communication to web browser 110 in step 312; based on receiving the indication to stop recording in step 306, the response to the additional communication is sent in the first format, but not the second format. Web browser 110 processes the response (in the first format) sent in step 312 in a normal manner. Micro browser 111 ignores the response sent in step 312 because micro browser 111 is no longer recording communications between web browser 110 and server 130.

Figure 4:
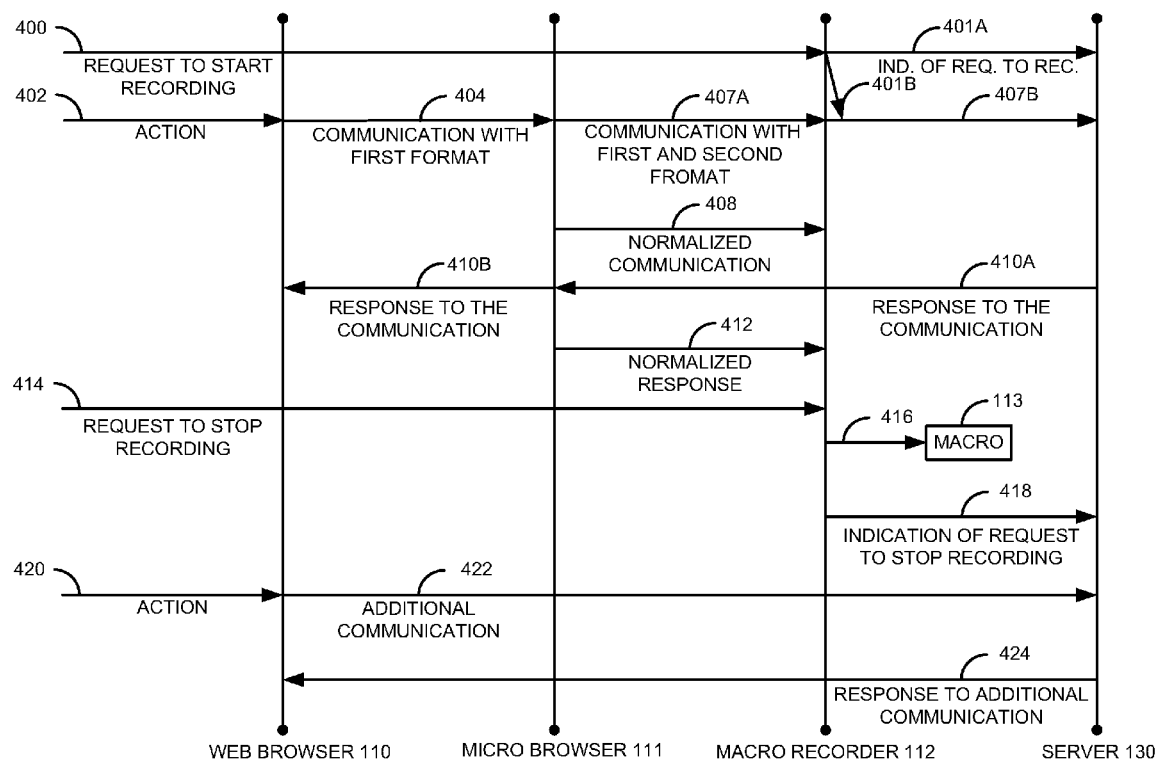
FIG. 4 is a flow diagram of a method for generating a macro based on communication exchanges between a web browser and a server.

FIG. 4 is a flow diagram of a method for generating macro 113 based on communication exchanges between web browser 110 and server 130. The process begins in step 400 when a request to start recording one or more communication exchanges between web browser 110 and server 130 is received by macro recorder 112. An indication of the request to start recording can optionally be sent in steps 401A or 401B to server 130. For example, a separate message can be sent in step 401A that contains the indication of the request to start recording. The indication of the request to start recording can be sent as part of the communication sent in step 407B.

An action occurs in step 402 that initiates a communication being sent in step 404 that contains the first format. Micro browser 111 adds the second format to the communication in step 406A. The information in the communication in the second format typically comprises information similar to the information in the first format (e.g., a micro format). The information in the second format is used by macro recorder 112 to record the communication exchanges between web browser 110 and server 130. The communication is recorded by macro recorder 112 and sent to server 130 in step 407B. Micro browser 111 creates and sends a normalized representation of the communication to macro recorder 112 in step 408.

In response to receiving the communication sent in step 407B and optionally the indication of the request to start recording received in step 401, server 130 sends a response in step 410A. The response comprises a response in the first format and a response in the second format. Micro browser 111 receives the response in step 410A as well as web browser 110 in step 410B. Micro browser 111 parses the response sent in step 410A to produce a normalized representation of the response. The normalized representation of the response is sent to macro recorder 112 in step 412. A request to stop recording is sent to macro recorder 112 in step 414. The request to stop recording can be generated by a user clicking on a stop recording button in a browser plug-in, an application, and the like. Based on the receiving request to stop recording, macro recorder 112 generates macro 113 in step 416.

Macro recorder 112 sends an indication of the request to stop recording to server 130 in step 418. An action occurs in step 420 that initiates an additional communication being sent in step 422 to server 130. For example, the action could be a user entering text to a text box in a web page that is being displayed in web browser 110. The action of entering text in the text box in web browser 110 sends the additional communication in the first format in step 422. Server 130 receives the additional communication sent in step 422. Server 130 sends a response to the additional communication to web browser 110 in step 424; based on receiving the indication to stop recording in step 418, the response to the additional communication is sent in the first format, but not in the second format. Web browser 110 processes the response sent in step 424 in a normal manner. Micro browser 111 ignores the response sent in step 424 because micro browser 111 is no longer recording communications between web browser 110 and server 130.

Figure 5:
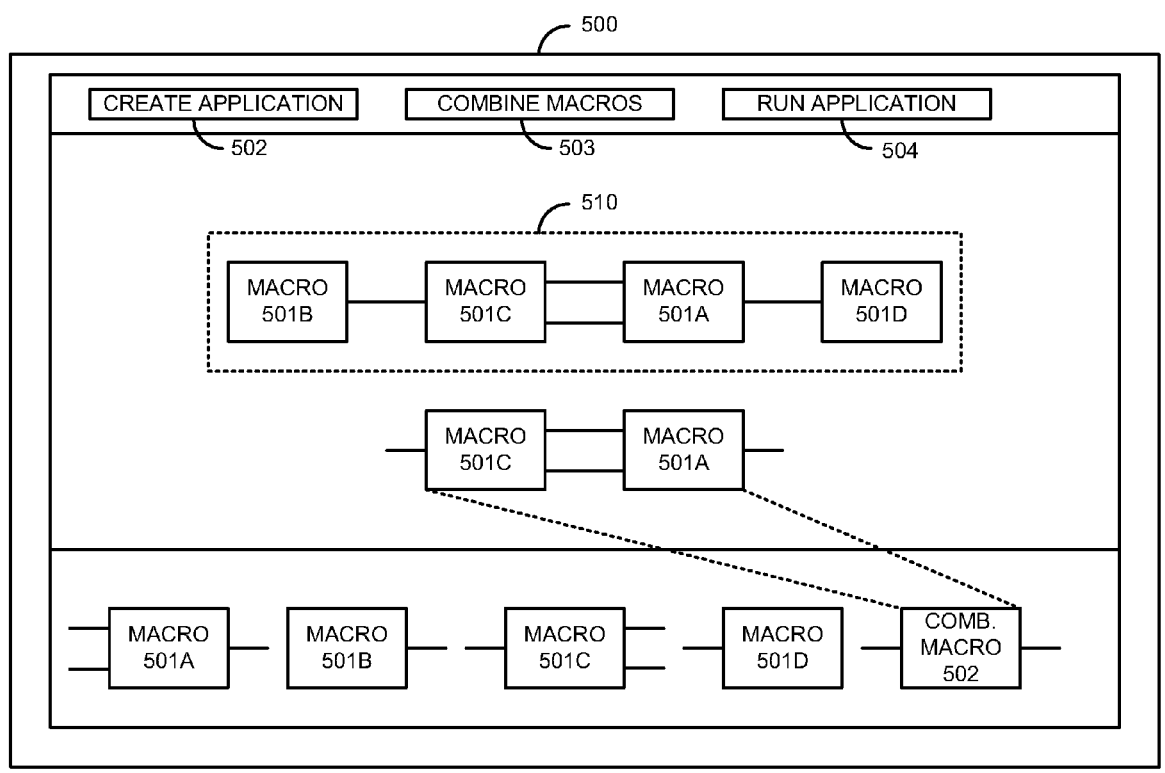
FIG. 5 is a diagram of an application development tool that can create an application based on a plurality of macros.

FIG. 5 is a diagram of an application development tool 500 that can create an application 510 based on a plurality of macros 113. Application development tool 500 comprises macro icons 501, combined macro 502, application 510, create application button 502, combine macros button 503, and run application button 504.

Once a macro 113 is recorded using the processes previously described, the recorded macros 113 can be shown as macro icon(s) 501 in application development tool 500. A user of application development tool 500 can create application 510 from the recorded macros 113. For example, the user can drag-and-drop the macro icons 501 to create application 510. In this example, the user has dragged-and-dropped macros 501A-501D to form application 510. Once the application is developed by the user, the user can click on the create application button 502 to create an application 510. The user can then run application 510 by clicking on the run application button 504.

The user can also combine macros to create a combined macro 502. For example, the user can select macros 501C and 501A and click on the combine macros button 503 to create combined macro 502. By combining macros, the user can easily develop applications 510. Combined macros 502 can be used as building blocks to build more complex applications 510 in the same manner as an individual macro 113.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving at a macro recorder a request to start recording one or more communication exchanges between a web browser and a server;
   sending a communication from the web browser in a first format to the server, wherein the first format is at least one of a content format and a protocol, the first format is one of HTML and XHTML, and the first format comprises human-readable Application Programming Interface (API) documentation about a user interaction with the server;
   recording by the macro recorder at least part of the communication;
   receiving at the web browser a response to the communication sent from the server, the response being sent from the server and received at the web browser and the response comprising the first format and a second format, wherein the second format is at least one of a content format and a protocol and is different than the first format, and the second format is not parsable by the web browser, and the first format in combination with the second format describes the machine-readable API about the user interaction with the server;
   sending a request to send a response with a specific type of second format and determining from the specific type of second format in the response a computer language to normalize a representation of the response;
   parsing in a micro browser the response in the second format to produce the normalized representation of the response;
   and generating in the macro recorder, a macro, wherein the macro is created based on the at least part of the communication and the normalized representation of the response.

2. The method of claim 1, further comprising the step of sending an indication of the request to start recording to the server and wherein the second format is sent based on the indication of the request to start recording.

3. The method of claim 1, wherein the communication further comprises the second format, and wherein the micro browser creates a normalized representation of the communication based on the second format and the macro recorder creates the macro based on the normalized representation of the communication and the normalized representation of the response.

4. The method of claim 1, further comprising the steps of: receiving in the macro recorder a request to stop recording the one or more communication exchanges between the web browser and the server, and sending from the macro recorder to the server an indication of the request to stop recording.

5. The method of claim 4, further comprising the steps of: creating a plurality of macros, wherein the plurality of macros are shown as macro icons in an application development tool and a user of the application development tool can create an application based on the plurality of macro icons.

6. The method of claim 4, further comprising the steps of: creating a plurality of macros and combining the plurality of macros to create a combined macro.

7. The method of claim 1, wherein the second format is a micro format, wherein the micro format is a format that is embedded within the first format, and wherein the parsing step normalizes the representation of the response by converting the micro format to one of JavaScript Object Notation, Resource Description Framework, Java, and C++.

8. The method of claim 1, wherein the first format guides a user interaction with the server.

9. The method of claim 8, wherein the second format is a micro format, wherein the micro format is a format that is embedded within the first format.

10. The method of claim 1, wherein the first format guides a user interaction with the server and wherein the normalized representation of the response describes a machine-readable API and a service invocation flow without the first format.

11. A method comprising:
    receiving at a server, an indication of a request to start recording one or more communication exchanges between a web browser and the server;
    receiving at the server, a communication from the web browser in a first format, wherein the first format is at least one of a content format and a protocol, the first format is one of HTML and XHTML, and the first format comprises human-readable Application Programming Interface (API) documentation about a user interaction with the server;
    in response to the receiving the indication of the request to start recording the one or more communication exchanges and receiving the communication, sending a response to the communication, the response being sent from the server and received at the web browser and the response comprising the first format and a second format, wherein the second format is at least one of a content format and a protocol and is different than the first format, and the first format in combination with the second format describes the machine-readable API about the user interaction with the server;
    receiving at the server, a request to send a response with a specific type of second format and determining from the specific type of second format in the response a computer language to normalize a representation of the response; and
    receiving at the server, an indication of a request to stop recording; and in response to receiving the indication of the request to stop recording, sending responses to additional communications from the web browser in the first format and not in the second format.

12. A system comprising:
a non-transitory computer-readable medium; a macro recorder configured to receive a request to start recording one or more communication exchanges between a web browser and a server, record at least part of a communication, and generate a macro, wherein the macro is created based on the at least part of the communication and a normalized representation of a response to the communication;
a web browser configured to send the communication in a first format to the server, wherein the first format is at least one of a content format and a protocol, the first format is one of HTML and XHTML, and the first format comprises human-readable Application Programming Interface (API) documentation about a user interaction with the server, receive a response to the communication sent from the server, the response being sent from the server and received at the web browser and the response comprising the first format and a second format, wherein the second format is at least one of a content format and a protocol and is different than the first format, and the second format is not parsable by the web browser, and the first format in combination with the second format describes the machine-readable API about the user interaction with the server;
the macro recorder is further configured to send a request to respond with a specific type of second format and a micro browser is configured to determine from the specific type of second format in the response, a computer language to normalize the representation of the response; and
the micro browser is further configured to parse the second format to produce the normalized representation of the response.

13. The system of claim 12, wherein a macro recorder is further configured to send an indication of the request to start recording to the server and the second format is sent based on the indication of the request to start recording.

14. The system of claim 12, wherein the communication further comprises the second format, and wherein the micro browser is further configured to create a normalized representation of the communication based on the second format and the macro recorder is further configured to create the macro based on the normalized representation of the communication and the normalized representation of the response.

15. The system of claim 12, wherein the macro recorder is further configured to receive a request to stop recording the one or more communication exchanges between the web browser and the server, and to send an indication of the request to stop recording to the server.

16. The system of claim 15, wherein the macro recorder is further configured to create a plurality of macros, wherein the plurality of macros are shown as macro icons in an application development tool and a user of the application development tool can create an application based on the plurality of macro icons.

17. The system of claim 15, wherein the macro recorder is further configured to create a plurality of macros and combine the plurality of macros to create a combined macro.

18. A system comprising:

a non-transitory server configured to:

receive an indication of a request to start recording one or more communication exchanges between a web browser and the server, receive a communication from the web browser in a first format, wherein the first format is at least one of a content format and a protocol, the first format is one of HTML and XHTML, and the first format comprises human-readable Application Programming Interface (API) documentation about a user interaction with the server, in response to the receiving the indication of the request to start recording the one or more communication exchanges and receiving the communication, send a response to the communication, the response being sent from the server and received at the web browser and the response comprising the first format and a second format, wherein the second format is at least one of a content format and a protocol and is different than the first format, the second format is not parsable by the web browser, and the first format in combination with the second format describes the machine-readable API about the user interaction with the server, receive a request to respond with a specific type of second format and a micro browser is further configured to determine from the specific type of second format in the response, a computer language to normalize a representation of the response;

receive an indication of a request to stop recording, and in response to receiving the indication of the request to stop recording, send responses to additional communications from the web browser in the first format and not in the second format.

\* \* \* \* \*